UNITED STATES PATENT OFFICE.

LARS L. FILSTRUP AND EDDIE C. FILSTRUP, OF BENTON HARBOR, MICHIGAN.

BELT-TIGHTENING DEVICE.

1,182,004.      Specification of Letters Patent.      Patented May 9, 1916.

Application filed June 3, 1910. Serial No. 564,886.

*To all whom it may concern:*

Be it known that we, LARS L. FILSTRUP and EDDIE C. FILSTRUP, citizens of the United States of America, and residents of Benton Harbor, Michigan, have invented a certain new and useful Improvement in Belt-Tightening Devices, of which the following is a specification.

Our invention relates to improvements in saw sharpening machines, more especially in automatic belt tightening and adjusting devices for use in such machines, and has for its object the production of a device by means of which a belt may be kept tight and true, regardless of the shifting of position of one of the pulleys.

A further object is the production of a device especially well adapted for use in connection with saw sharpening machines in which the position of the driving pulley for the grinding wheel is constantly shifting.

A further object is the production of improved mechanism for use in connection with saw sharpening machines that can be readily attached to types of machines now in use without material alteration to such machines.

These and such other objects as may hereinafter appear, are attained by our device, embodiments of which are illustrated in the accompanying drawings, in which:

Like numerals of reference indicate like parts in the several figures of the drawings.

Figure 1:
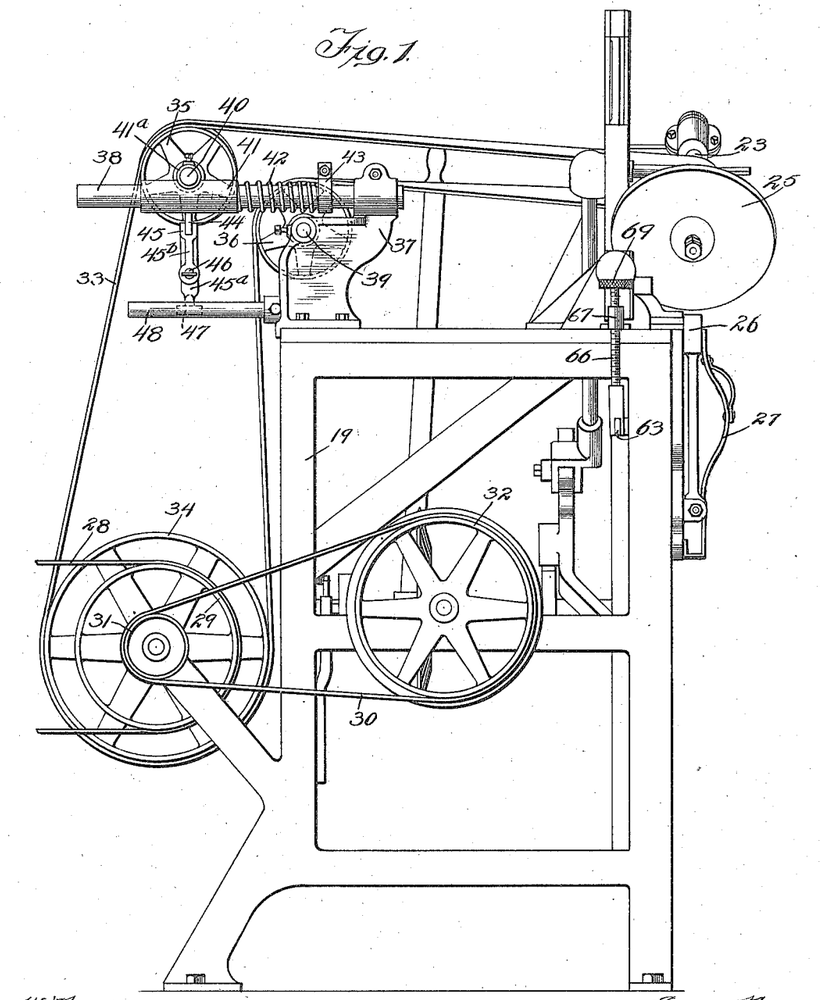
Figure 1 represents a side elevation of a saw sharpening machine embodying our improvements.

Referring now to the drawings, and particularly to Fig. 1. The numeral 19 refers to the frame of a saw sharpening machine on the front of which is mounted a gate frame support 20. A gate frame 21 is movably mounted in said support; a gate 22 is slidably mounted in the gate frame. A shaft or arbor 23 on which is mounted an arbor pulley 24 is positioned within the gate, and on the end of the wiper 23 is mounted the grinding wheel 25.

In the operation of the machine the grinding wheel 25 is brought in contact with the teeth of a saw (not shown) resting in a guide or support 26, and is held in position by means of a spring hasp 27. The angular position of the grinding wheel is varied by moving the gate frame about the arc of a circle the center of which is the point of contact of the grinding wheel on the tooth of the saw, while the vertical adjustment of the grinding wheel is accomplished by the movement of the gate within the gate frame.

Power is transmitted to the machine through the belt 28 over the drive pulley 29, and the belt 30 over the pulleys 31—32. The power to operate the grinding wheel is transmitted through the belt 33 passing over the main pulley 34, the movable pulley 35, the arbor pulley 24 on the grinding wheel arbor and the idler 36.

Referring now more especially to Fig. 1: On the rear of the frame 19 is mounted a supporting casting 37 having a bore in its upper end within which is mounted the pulley supporting shaft 38. The spindle 39 of the idler 36 is also mounted on this casting. The pulley 35 is mounted on the spindle 40 supported in the journal casting 41, slidably mounted on the shaft 38. A spring 42 is slipped over the shaft between the journal casting and the supporting casting, and adapted to bear against a sliding collar 43 also mounted on the shaft and through the medium of which the tension of the spring may be adjusted. The angular adjustment of the pulley 35 is effected by turning the bearing 41 on the shaft 38.

The journal bearing casting 41 is extended downwardly below the shaft, forming an arm 44. A yoke 45 is loosely mounted on a pin 46 passing through the arm 44, the lower end of the arm being positioned between the two arms 45ª and 45ᵇ of the yoke 45. A thumb-screw passes through the end of the arm 45ᵇ engaging the lower end of the arm 44. On the lower end of the arm 45ª is a roller 47 resting against a rod or shaft 48 also mounted on the support 37, the pressure on the pulley 35 holding the roller against the shaft 48.

When by reason of the shifting of position of the grinding wheel arbor it is advisable to change the inclination of the spindle 40, it is simply necessary to turn the thumb-screw 46ª, thus raising or lowering the end of the spindle as the roller 47 always remains in contact with the shaft or bar 48. It will also be noted that the spindles 39 and 40 are extended, thus permitting the pulleys 35—36 to slide in and out, as occasion may require. It will thus be seen that by adjusting the spring 42 to the proper tension, all variations in the length of the belt caused either by the stretching of the belt itself or by changes in the position of parts of the machine are automatically taken care of and the belt is kept running true by a combination of operations that is the manual adjustment of the angle of the spindle 40 and the automatic movement of the pulley 35 on the spindle. It will thus be noted that by the use of our improved means the belt is kept taut and true, regardless of range of movement of the grinding wheel.

Figure 4:
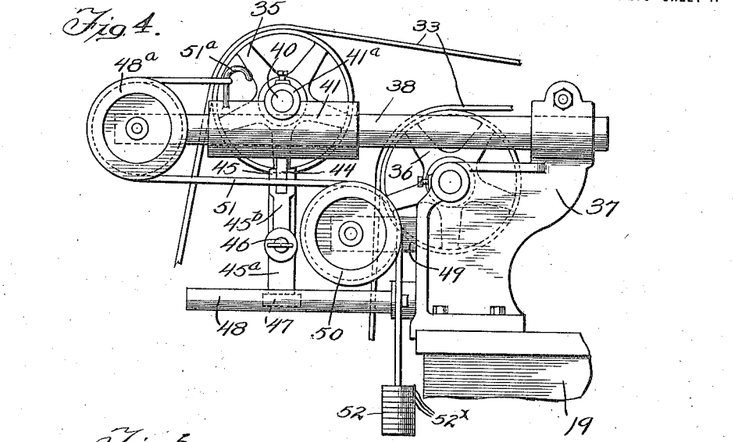
Fig. 4 represents an enlarged side elevation of a modified form of our device.
Figure 5:
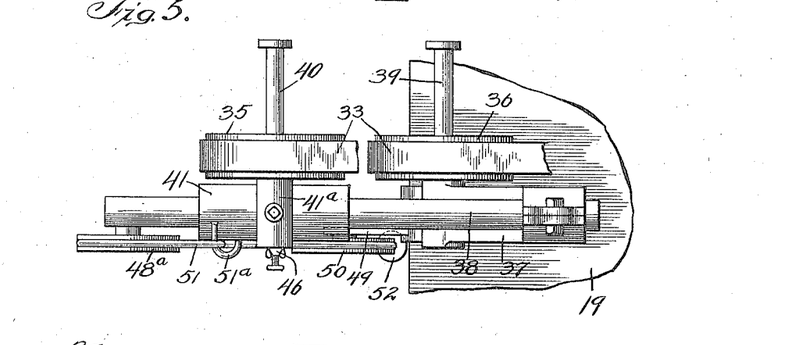
Fig. 5 represents a top plan view of Fig. 4.
Figure 6:
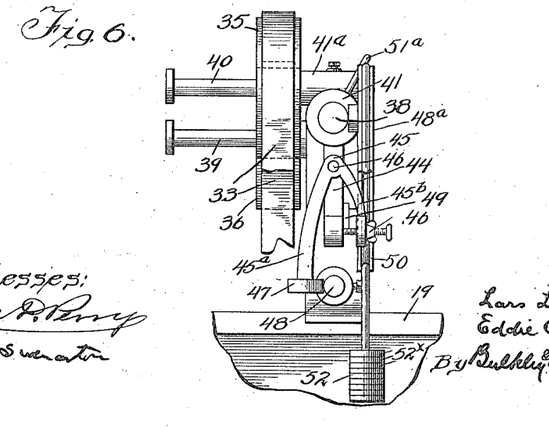
Fig. 6 represents an end view of Fig. 4.

Referring now to Figs. 4, 5 and 6. In this form the spring 42 is dispensed with. On the end of the shaft 38 we mount a grooved pulley 48ª, and on an arm 49 secured to the casting 37 is mounted a second grooved pulley 50. On one end of a cord 51 is secured a hook 51ª on the slidingly mounted journal casting 41, the cord passing over the pulleys 48ª and 50, and having a weight 52 attached to its lower end. The weight is made up of series of small disks or weights 52ˣ, as by removing or adding any number of the disks the pull on the casting 41 necessary to counteract that of the belt may be accurately adjusted.

Figure 7:
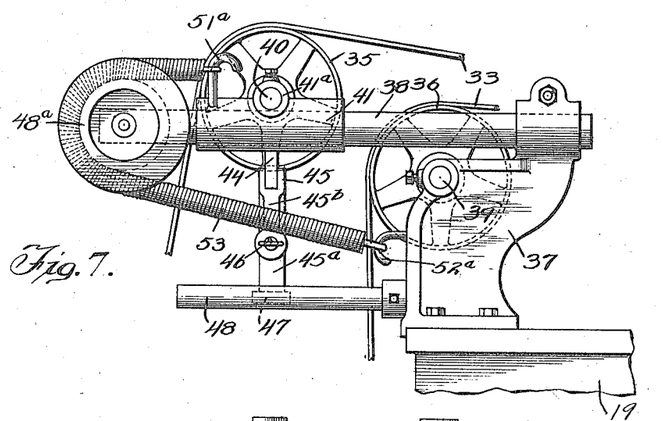
Fig. 7 represents an enlarged side elevation of another form of our device.
Figure 8:
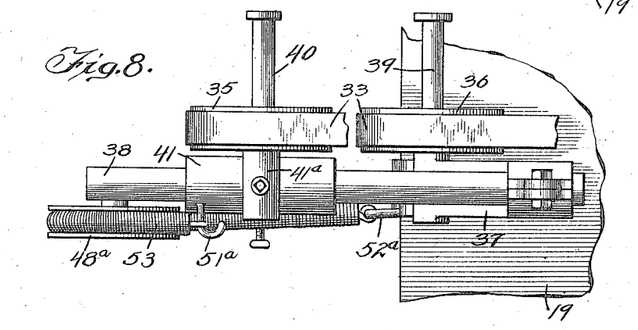
Fig. 8 represents a top plan view of Fig. 7.
Figure 9:
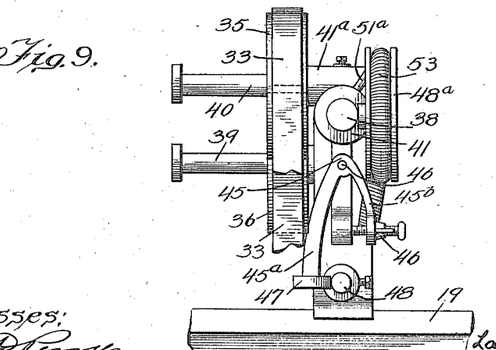
Fig. 9 represents an end view of Fig. 7.

In the modification shown in Figs. 7, 8 and 9, we dispense with the weight 5 and pulley 50, and in place of the cord 51 we provide a spring 53 passing over the grooved pulley, one end being secured to the support 51ª and the other to a similar support 52ª mounted on the casting 37. In this form the tension of the spring 53 is substituted for the pull of the weight.

Figure 10:
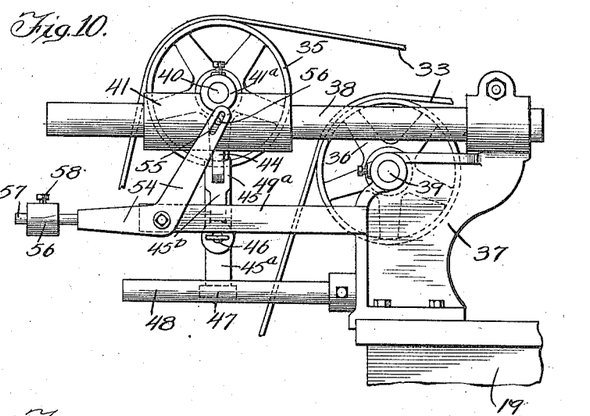
Fig. 10 represents an enlarged side elevation of still another form of our device.
Figure 11:
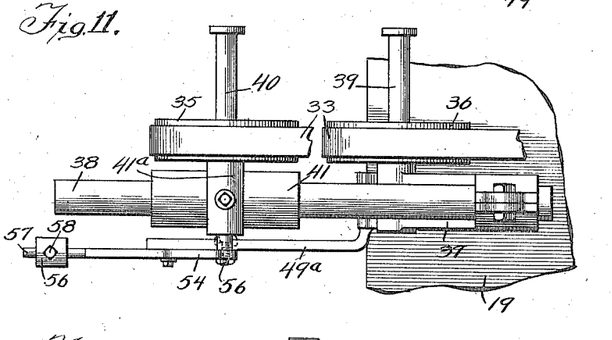
Fig. 11 represents a top plan view of Fig. 10.
Figure 12:
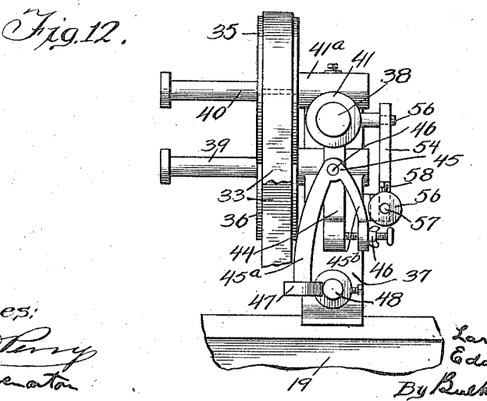
Fig. 12 represents an end view of Fig. 10.

Referring now to Figs. 10, 11 and 12 an arm 49ª is mounted on the casting 37 extending beyond the limit of travel of the pulley 35. On the end of this arm is mounted a bell-crank lever 54. The upper arm is provided with a slot 55, and a pin 56 on the casting 41 is positioned to slide within the slot. On the outer end of the lever 54 is mounted a sliding weight 56ª, the end 57 of the lever being extended to form a support for the weight and a set screw 58 being provided to hold the weight in any desired position on the support 57. It will thus be seen that any tendency of the pulley 35 to slide toward the guiding wheel will be resisted by the weight 56ª acting through the bell-crank lever and by adjusting the size and position of the weight on the end 57 any looseness in the belt is taken up by forcing the bearing casting 41 outwardly on the bar 38.

Figure 13:
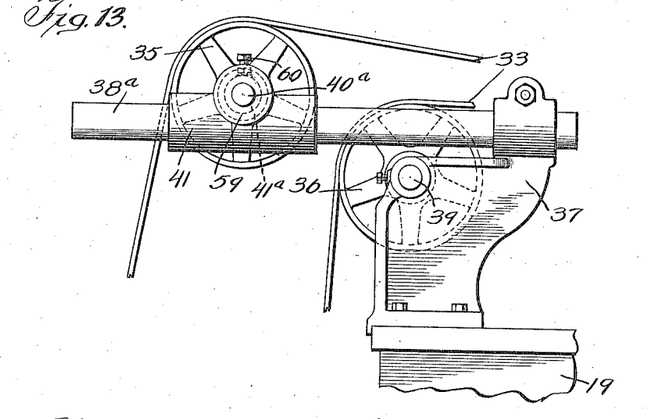
Fig. 13 represents a side elevation of a modification of a portion of our device.
Figure 14:
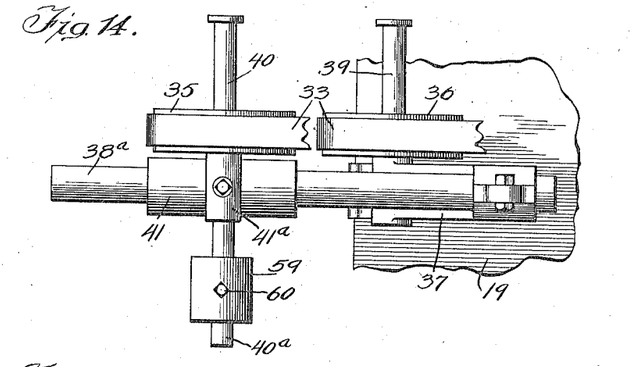
Fig. 14 represents a top plan view of Fig. 13.
Figure 15:
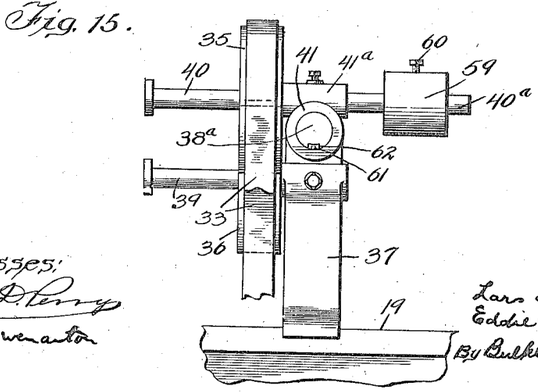
Fig. 15 represents an end view of Fig. 1.

Referring now to Figs. 13, 14 and 15 in which we have illustrated means for regulating the inclination of the spindle 40: This spindle is extended beyond the bearing 41ª forming a weight supporting arm 40ª on which is mounted a weight 59 held in position by means of a set-screw 60. The bearing casting 41ª is provided with an upwardly projecting lug or stop 61 sliding within a channel 62 in the shaft or bar 38ª, thus confining the rocking motion of the bearing on the shaft within certain defined limits. As the inclination of the grinding wheel arbor changes the position of the pulley on the spindle changes and the position of the weight is shifted to accommodate the conditions in the case.

Figure 2:
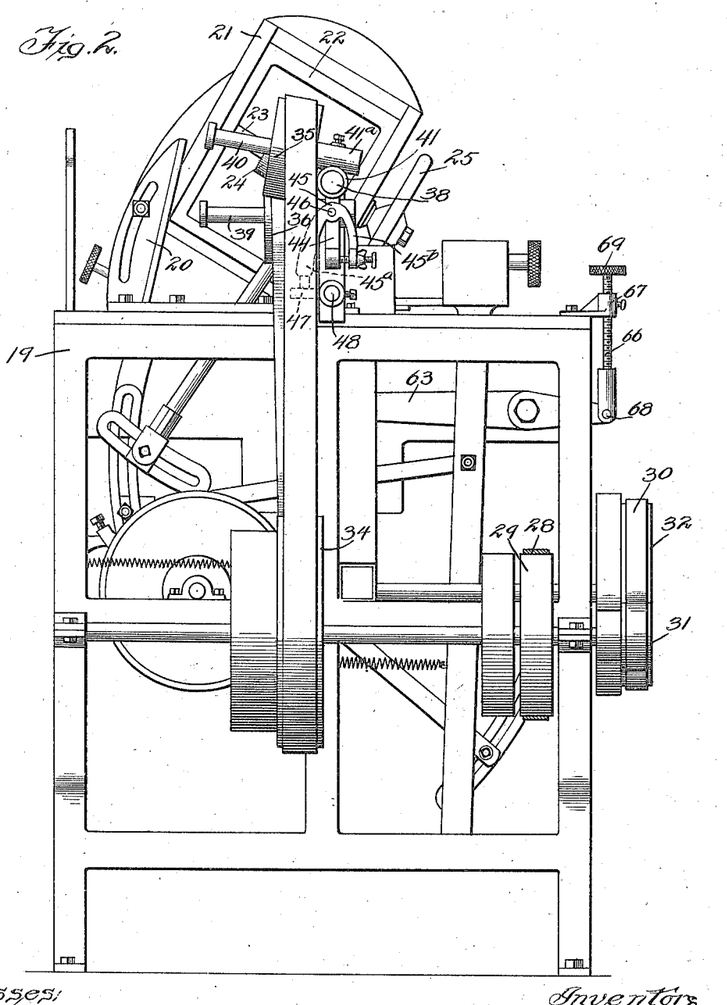
Fig. 2 represents a rear elevation of the machine shown in Fig. 1.
Figure 3:
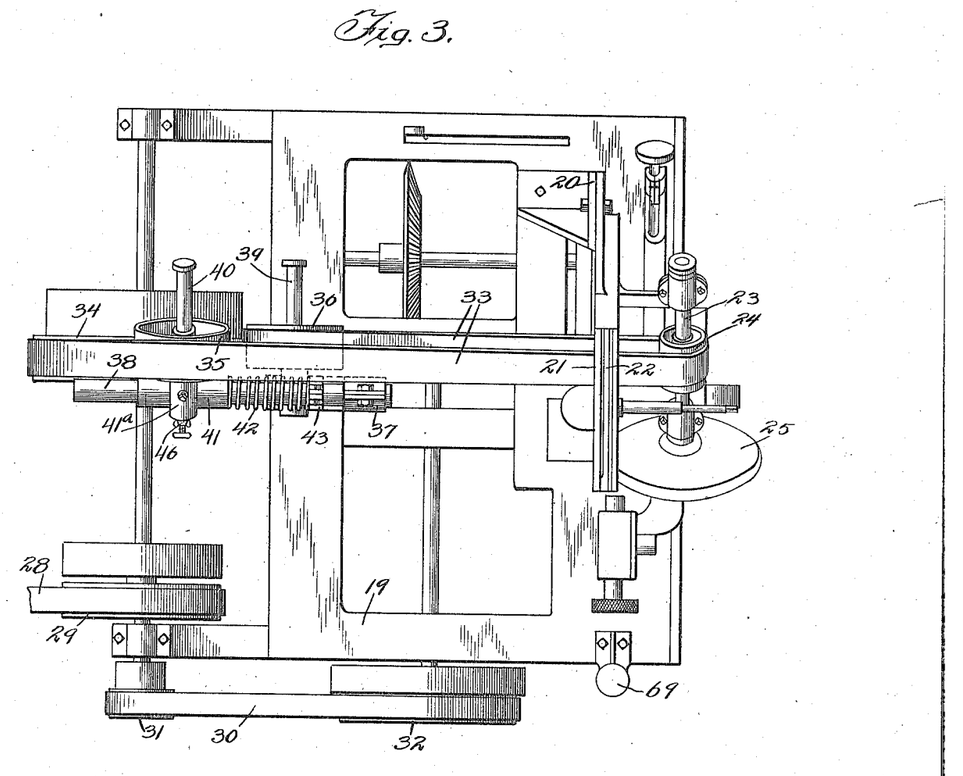
Fig. 3 represents a top plan view of said machine.

For the vertical movement of the saw support a guide 26 is slidably mounted on a guiding frame 62ª on the front frame of the machine and is moved vertically by means of a lever 63, one end of which may be attached at 64 in any suitable manner to the guide. The lever 63 is pivotally mounted at a point intermediate of its length. A screw 66ª is mounted in a threaded support 67 (Figs. 1, 2 and 3) on the top of the frame 19 and is pivotally connected to the other end of the lever at 68. It is thus apparent that by turning the handle 69 on the top of the screw the movement of the lever raises or lowers the guide 26 in its frame 62, thus providing a simple means for adjusting the position of the saw while it is being operated upon.

Figure 16:
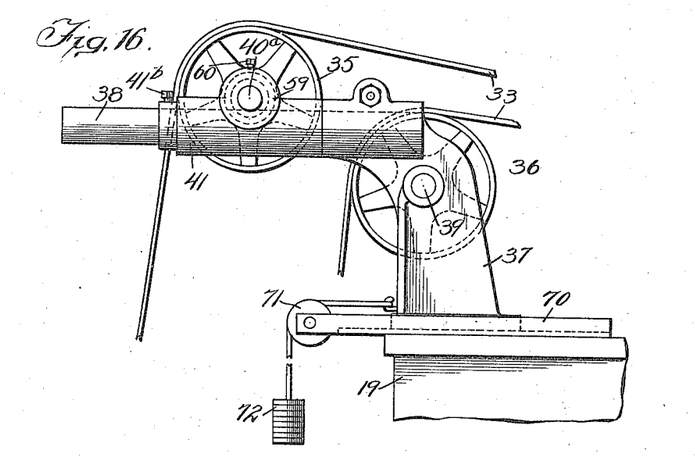
Fig. 16 shows a side elevation of another form of our device.
Figure 17:
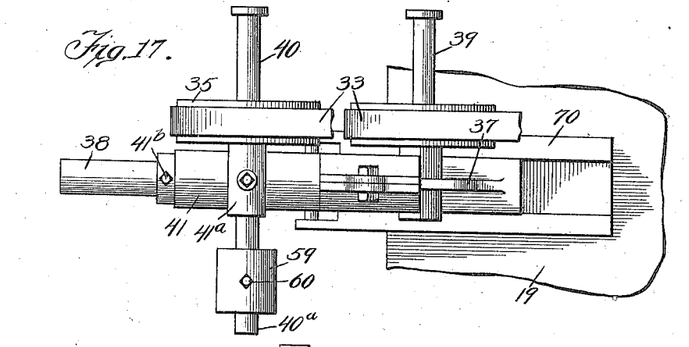
Fig. 17 represents a top plan view of Fig. 16.
Figure 18:
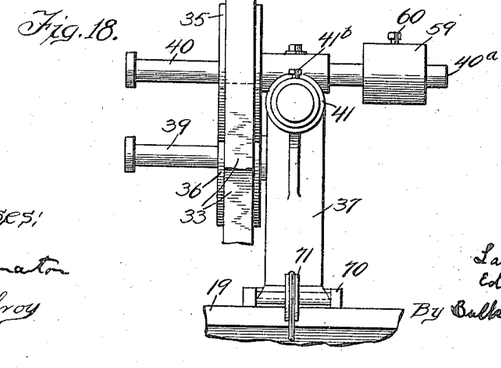
Fig. 18 is an end view of Fig. 16.

Referring to Figs. 16, 17 and 18: It is there shown another modification of our device, in which the idler pulleys 35 and 36 are stationary with respect to the frame 37 upon which they are mounted, while this frame is mounted upon a gate 70, and is free to move therein. The pulley 71 is attached to the end of this gate, and a cord and weight 72 passing through this pulley is so attached to the frame 37 as to maintain the tension of the belt in a manner which is clearly evident from an inspection of these figures. It will be noted that in this modification the tension upon the belt is maintained through both of the pulleys instead of but one. It is obvious that in place of the weight 72 this tension can be maintained by means of a spring, these being obvious equivalents.

We claim:

1. In a machine of the class described, the combination with a frame, an arbor adjustably mounted in said frame so that its position may be shifted, a belt for transmitting power to and actuating said arbor, means including a movable pulley for regulating the tension of said belt, and separate means for regulating the angular position of said pulley about an axis at right angles to the axis of the pulley regardless of the changed position of said arbor.

2. In a machine of the class described, the combination with a frame, an arbor adjustably mounted in said frame so that its position may be adjusted angularly with respect to said frame, an arbor pulley, a belt for transmitting power to said arbor pulley, a plurality of fixed pulleys over which said belt passes, means including a movable pulley over which said belt passes, for regulating the tension of said belt, and means for regulating the angular position of said movable pulley with respect to said fixed pulleys regardless of the relative position of said arbor pulley.

3. In a machine of the class described, the combination with a frame, an arbor adjustably mounted in said frame adapted to be adjusted angularly with respect to said frame, power-transmitting means for actuating said arbor, said means comprising a plurality of fixed pulleys, a movable pulley having a substantially cylindrical periphery, an arbor pulley, a belt passing over said pulleys, and means for shifting said movable pulley with respect to said arbor pulley.

4. In a machine of the class described, the combination with a frame, an arbor adjustably mounted in said frame so that its position may be angularly adjusted with respect to said frame, power-transmitting means for actuating said arbor, comprising a plurality of fixed pulleys, a movable pulley, an arbor pulley, a belt passing over said pulleys, means for shifting the movable pulley toward and from the arbor pulley, and means for shifting the angular position of said movable pulley with respect to one or more of said fixed pulleys.

5. In a machine of the class described, the combination with a frame, an arbor adjustably mounted in said frame so that its position may be adjusted with respect to said frame, power-transmitting means for actuating said arbor, comprising a plurality of fixed pulleys, a movable pulley, an arbor pulley, a belt passing over said pulleys, a bearing casting for said movable pulley, an arm depending therefrom, a yoke carried by said depending arm and consisting of a plurality of arms, and means for causing one of said yoke arms to bear against said depending arm to shift the angular position of said movable pulley with respect to one or more of said fixed pulleys.

6. In a machine of the class described, the combination with a frame, an arbor mounted in said frame so that its position may be shifted with respect to said frame, power-transmitting means for actuating said arbor, said means comprising a plurality of fixed pulleys, a movable pulley, an arbor pulley, a belt passing over said pulleys, and adjustable means responsive to the tension of said belt for automatically regulating the tension thereof regardless of the position of said arbor pulley, and separate means for shifting the angular position of said movable pulley with respect to said fixed pulleys.

7. In a machine of the class described, the combination with a frame, an arbor, means for shifting the position of said arbor angularly with respect to said frame, power-transmitting means for actuating said arbor, said means comprising a plurality of fixed pulleys, a movable pulley having a substantially cylindrical periphery, an arbor pulley, a belt passing over said pulleys, and automatically adjustable means for shifting said movable pulley relatively to said arbor pulley.

8. In a machine of the class described, the combination with a frame, an arbor adjustably mounted in said frame and adapted to be adjusted angularly with respect to said frame, power transmitting means for actuating said arbor comprising a plurality of fixed pulleys, a movable pulley having a substantially cylindrical periphery, an arbor pulley, a belt passing over said pulleys, and automatically adjustable spring-controlled means for shifting said movable pulley relatively to said arbor pulley.

9. In a machine of the class described, a frame, an arbor adjustably mounted in said frame so that its position may be shifted, power transmitting means for actuating said arbor, said means comprising a plurality of fixed pulleys, a movable pulley, an arbor pulley, a belt passing over said pulleys, automatically adjustable spring-controlled means for shifting the position of said movable pulley to and from said arbor pulley, and means for adjusting the angular position of said movable pulley with respect to one of said fixed pulleys.

10. In a machine of the class described, the combination with a frame, an arbor adjustably mounted in said frame so that its position may be shifted, a support for carrying said arbor, means for varying the vertical position of said support, and means including a belt and a movable pulley over which said belt passes, for actuating said arbor and for regulating the tension of said belt regardless of the changed position of said arbor, and separate means for shifting the position of said pulley.

Signed by us at Benton Harbor, Michigan, this 6th day of May, 1910.

LARS L. FILSTRUP.
EDDIE C. FILSTRUP.

Witnesses:
HUMPHREY S. GRAY,
SUZANNE U. KELLEY.

Copies of this patent may be obtained for five cents each, by addressing the "Commissioner of Patents, Washington, D. C."